(12) United States Patent
Gruber et al.

(10) Patent No.: US 8,509,250 B2
(45) Date of Patent: Aug. 13, 2013

(54) RESOURCE ALLOCATION METHOD AND APPARATUS THEREOF

(75) Inventors: Markus Gruber, Korntal-Muenchingen (DE); Dietrich Zeller, Sindelfingen (DE); Stephen Kaminski, Eislingen (DE)

(73) Assignee: Alcatel Lucent, Paris (FR)

( * ) Notice: Subject to any disclaimer, the term of this patent is extended or adjusted under 35 U.S.C. 154(b) by 232 days.

(21) Appl. No.: 12/988,600

(22) PCT Filed: Apr. 28, 2009

(86) PCT No.: PCT/EP2009/055091
§ 371 (c)(1),
(2), (4) Date: Oct. 19, 2010

(87) PCT Pub. No.: WO2009/133081
PCT Pub. Date: Nov. 5, 2009

(65) Prior Publication Data
US 2011/0038340 A1 Feb. 17, 2011

(30) Foreign Application Priority Data
Apr. 28, 2008 (EP) .................................... 08290406

(51) Int. Cl.
*H04L 12/56* (2011.01)

(52) U.S. Cl.
USPC ......................................................... 370/401

(58) Field of Classification Search
None
See application file for complete search history.

(56) References Cited

U.S. PATENT DOCUMENTS

| | | | | |
|---|---|---|---|---|
| 7,885,214 B2 * | 2/2011 | Ahmadi et al. | ............... | 370/295 |
| 2010/0135220 A1 * | 6/2010 | Bergstrom et al. | ........... | 370/329 |

FOREIGN PATENT DOCUMENTS

| | | |
|---|---|---|
| EP | 1 903 813 A | 3/2008 |
| WO | WO 2008/023928 A | 2/2008 |
| WO | WO 2008/024321 A | 2/2008 |

OTHER PUBLICATIONS

International Search Report for PCT/EP2009/055091.
European Search Report for EP 08290406.1 dated Oct. 29, 2008.

\* cited by examiner

*Primary Examiner* — Raj Jain
(74) *Attorney, Agent, or Firm* — Fay Sharpe LLP (57) ABSTRACT

The invention provides a resource allocation method for a network element adapted for multimedia broadcast and synchronized services in a mobile communication system, the mobile communication system comprising a plurality of base stations synchronized for data transmission, the method comprising: inputting a set of synchronized subframe numbers per radio frame and a total number of radio frames, wherein each radio frame contains a predefined number of subframes; selecting a first value of the set of synchronized subframe numbers; first allocating the first value as a number of synchronized subframes per frame to the total number of radio frames; second allocating the first value as the number of synchronized subframes per frame to a first half of the total number of radio frames, if the first allocating step is not performed; and selecting a second value of the set of synchronized subframe numbers. The method further comprises: third allocating the second value as the number of synchronized subframes per frame to the first half of the total number of radio frames, if the first and second allocating step is not performed; forth allocating the second value as the number of synchronized subframes per frame to a second half of the total number of radio frames, if the second allocating step is performed; selecting a third value of the set of synchronized subframe numbers; wherein one of the allocating steps is performed according to bandwidth requirements of the multimedia broadcast and synchronized services.

15 Claims, 6 Drawing Sheets

RESOURCE ALLOCATION METHOD AND APPARATUS THEREOF

FIELD OF THE INVENTION

The invention relates to a method of resource allocation in a mobile communication system, to a wireless element and to a computer program product.

BACKGROUND AND RELATED ART

The connection between a wireless terminal and a network element of a wireless wideband communication network is generally established via an air interface. The air interface can be a wireless wideband system compliant with the IEEE 802.16 or Long Term Evolution (LTE) standard. The wideband wireless systems, apart from the unicast communications, may also provide multicast and broadcast services to the wireless terminals. The broadcasting mode uses the network capabilities to send information to all destinations without congesting the network capacity, using either broadcast channels or different world routing methods. A more controlled approach is reached using the multicast mode, as it transports the packets to a group of destinations simultaneously, delivering the message over each link of the network only once and creating copies only when the link to the destinations split.

The wireless terminals may receive several versions of the same packets or frames within a multicast and broadcast zone from several base station transmitters. This can be used, for example, for multimedia broadcast and multicast services. The terminals may take advantage of the plurality of packets using the principle of macro diversity and thus improving the reception quality of the signal. In this context, terminals always need to know which resource entities are synchronized and which are not synchronized in order to correctly perform measurements of the reference symbols.

There is therefore a need for a method of resource allocation for multicast and broadcast services, a wireless terminal, and a computer program product for performing the method in accordance with the invention.

SUMMARY

The invention provides a resource allocation method for a network element adapted for multimedia broadcast and synchronized services in a mobile communication system, the mobile communication system comprising a plurality of base stations synchronized for data transmission, the method comprises: inputting a set of synchronized subframe numbers per radio frame and a total number of radio frames, wherein each radio frame contains a predefined number of subframes; selecting a first value of the set of synchronized subframe numbers; first allocating the first value as a number of synchronized subframes per frame to the total number of radio frames; second allocating the first value as the number of synchronized subframes per frame to a first half of the total number of radio frames, if the first allocating step is not performed; and selecting a second value of the set of synchronized subframe numbers.

The method further comprises: third allocating the second value as the number of synchronized subframes per frame to the first half of the total number of radio frames, if the first and second allocating step is not performed; forth allocating the second value as the number of synchronized subframes per frame to a second half of the total number of radio frames, if the second allocating step is performed; selecting a third value of the set of synchronized subframe numbers; fifth allocating the third value as the number of synchronized subframes per frame to a third half of the second half of radio frames, if the first and forth allocating step is not performed, wherein one of the allocating steps is performed according to bandwidth requirements of the multimedia broadcast and synchronized services.

Embodiments of the invention are advantageous in that it allows a flexible allocation of the synchronized subframes on each single radio frame according to the number of synchronized subframes required for each multimedia broadcast and multicast service. At the same time, it reduces the number of combinatorial possibilities in order to minimize the necessary signaling and synchronization between the network elements and the wireless terminal. The minimization of signaling resources is a primary requirement in the design of single frequency networks subframe allocation. The embodiments allow signaling a limited number of synchronized subframe allocations per frame, so that the total number of synchronized subframes can get adjusted to the service requirements and the bandwidth that each multimedia broadcast and multicast service requires. If the bandwidth requirements of the multimedia broadcast and synchronized services are small, a minimum number of the set of synchronized subframes can be allocated for all the radio frames. If the bandwidth requirements are higher, half or all the radio frames can allocate the maximum number of the set of synchronized subframes.

The method further comprises: sixth allocating the second value as the number of synchronized subframes per frame to the total number of radio frames, if none of previous allocating steps is performed; selecting a forth value of the set of synchronized subframe numbers; and seventh allocating the forth value as the number of synchronized subframes per frame to a forth half of the second half of radio frames, if the fifth allocating step is performed.

The term synchronized subframe as herein refers to a subframe using the same time and frequency resources throughout a plurality of base stations adapted for multicast and broadcast service.

Embodiments of the invention further comprise outputting a look up table with a set of allocation possibilities. The set of synchronized subframe numbers is obtained by iteratively halving a maximum number of synchronized subframes per frame. If the maximum number of synchronized subframes per frame is not a power of two number, a next highest power of two number is used for obtaining the set of synchronized subframe numbers.

In accordance with other embodiments of the invention, a first radio frame is allocated with the first value and a second radio frame contiguous to the first radio frame is allocated with the second value. The network element is a base station, wherein the total number of radio frames is transmitted by the plurality of synchronized base stations. The synchronized subframes are used for the multimedia broadcast and synchronized service. The synchronized subframes are MBSFN subframes. The MBSFN subframes carry multimedia broadcast and multicast services (MBMS) in a coordinated way within a single frequency network.

The total number of possibilities to consider and to signal depends on the set of synchronized subframes and the allocation possibilities for each of these subframes, that correspond to the total of the radio frames, half of the radio frames or none of the radio frames that get allocated. The order of radio frames does not require following the order of descending or ascending synchronized subframe occurrences.

In another aspect, the invention relates to a network element for a mobile communication system, being operable to perform in accordance with any one of the preceding claims. In one embodiment, the network element is a base station. In another embodiment, the base station performs at least one of the first to seventh allocating steps, wherein the base station sends a signaling to a wireless terminal indicating one of the first to seventh allocating steps. In a further embodiment, the network element is a wireless terminal.

In another aspect, the invention relates to a mobile communication system, the mobile communication system being operable to perform in accordance with any one of the preceding embodiments.

In another aspect, the invention relates to a computer program product stored on a storage medium, comprising executable program means for causing a network element to perform a method according to any of the preceding embodiments when the program is run on the network element.

BRIEF DESCRIPTION OF THE DRAWINGS

In the following preferred embodiments of the invention will be described in greater detail by way of example only making reference to the drawings in which.

DETAILED DESCRIPTION

Figure 1:
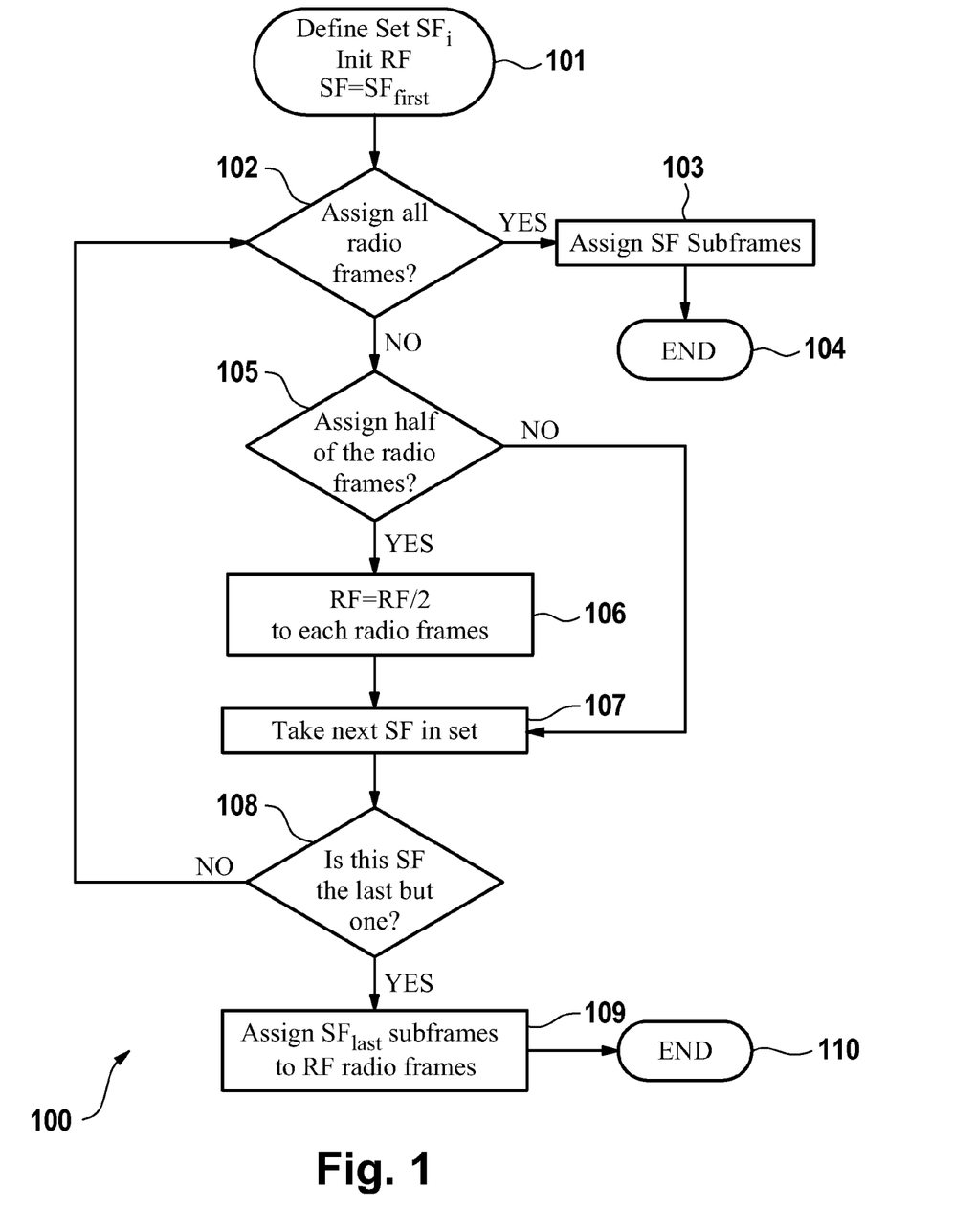
FIG. 1 shows a block diagram of a resource allocation method.

FIG. 1 shows a resource allocation method 100 for a network element adapted for multimedia broadcast and multicast service in a mobile communication system. The method 100 allocates synchronized subframes within a radio frame that are used for multicast and broadcast services in the mobile communication system.

A complete flexibility of the alignment of synchronized resources within a given repetition period would amount to a high amount of overhead or signaling resources. On the other hand, a set of global definitions for subframe allocations per radio frame, from which only one can be configured at a time for all radio frames, would lead to a poor distribution of the resources. In this case, the resources cannot get adjusted to the service and bandwidth requirements and may lead to a waste of resources. Moreover, adding and removing services would get more complex in the context of multimedia broadcast and multicast services. For instance, if all radio frames have exactly four synchronized subframes, it can be difficult to add a service that only needs two of these subframes. In this case, either the other two synchronized subframes remain unused and wasted, or another existing service is reallocated to the other two synchronized subframes, increasing the complexity in the synchronized network.

The embodiments solve all the disadvantages explained above with the resource allocation method. The first step 101 defines the set of synchronized subframe numbers per radio frame (SF) and a total number of radio frames (RF). From this set of synchronized subframe numbers, a first value is selected.

In a second step 102 it is decided whether all the radio frames get allocated this first value as the number of synchronized subframes per frame. If that is the case, the step 103 assigns all the frames with the selected first value of synchronized subframes. As all the frames are selected, the step 104 finishes the method. Otherwise, if not all the radio frames are assigned, a fifth step 105 request whether half of the radio frames get assigned this first value of synchronized subframes per frame. If the answer is affirmative, the step 106 assigns the first value of synchronized subframes to half of the total of radio frames. Then, the step 107 selects the next second value of the set of synchronized subframe numbers. The step 107 is also reached if there is no assignment of half of the radio frames from step 105.

In step 108, the a request is made if the second value corresponds to the second to last value of the set of synchronized subframe numbers. If no, then the method returns to the step 102, where this second iteration will take into account if some of the radio frames have already been allocated with synchronized subframes. If the second value corresponds to the second to last value of the set of synchronized subframe numbers, a ninth step 109 assigns the last subframe value to all the radio frames that have not been previously allocated with the synchronized subframes and in a step 110 the method finishes. Each frame contains a predefined value of subframes and each subframe may correspond to a synchronized or to a non-synchronized subframe. The synchronized subframes may be used for multicast and broadcast services in a single frequency network, where a group of base stations are synchronized to transmit the same signal regarding these synchronized subframes simultaneously and at the same frequency.

Figure 2:
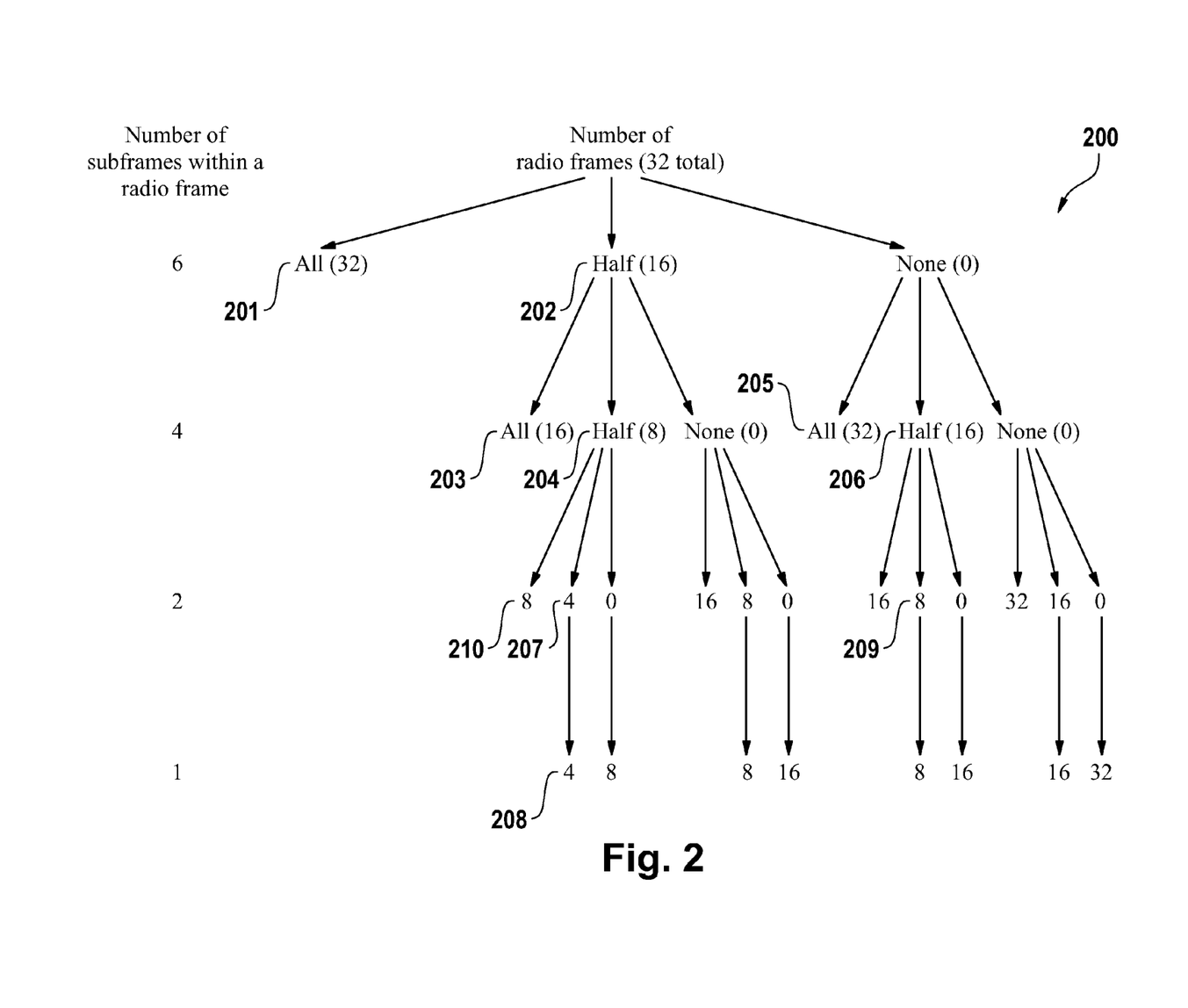
FIG. 2 shows a tree diagram of the resource allocation method.

FIG. 2 shows a tree representation 200 of the different possibilities that the resource allocation can take for a set of synchronized subframe numbers per radio frame as 6, 4, 2 and 1.

This set of synchronized subframe numbers may have been initialized or the set could have been calculated starting from the maximum number of subframes, and dividing by 2. In the case that the maximum number of subframes is not to a power of 2, the next highest power of 2 number is used as dividend This next highest number of power of 2 is not used for the allocation of the number of subframes, as only the predefined maximum number is the maximum allowed for the allocation. In the FIG. 2, the maximum number of subframes corresponds to 6 and the next highest power of 2 number, there is 8, is divided by 2 three times, in order to obtain the other number of subframes 4, 2, 1.

The first possibility of the algorithm is to assign to each frame of the total number of frames, that for the example corresponds to 32 radio frames, six subframes within a radio frame in 201. The second possibility corresponds to assigning to half of the total radio frames, or 16, six subframes for each radio frame on 202. The third possibility is that none of these frames gets assigned six subframes per radio frame, so that the next value of the set of synchronized subframe numbers if selected, that in this example correspond to four. If half of the radio frames have been already selected, then the second half of radio frames can get assigned four synchronized subframes on 203, or a half of this remaining second half gets assigned four subframes per frame, as in 204.

If no radio frame has been assigned six subframes per radio frame, then all 32 radio frames can get assigned four subframes as in 205. In a further possibility, half of this total of radio frames, corresponding to 16 radio frames, gets assigned four synchronized subframe per radio frame as in 206. Of the remaining half, a half of it may get assigned eight subframes as in 209. As long as there are any remaining unassigned radio frames, the allocations method will continue, or until the last value of the set of synchronized subframe numbers is achieved. In that case, the remaining unassigned subframes get assigned this last value of synchronized subframes, that in this example correspond to one synchronized subframe per radio frame.

If for example a first half of the total of radio frames has been assigned six synchronized subframes, as in 202 and a half of the remaining unassigned frames has been assigned four synchronized subframes, a third value will be used. Again, if a half of the remaining unassigned radio frames gets assigned two synchronized subframes per radio frames, as in 207, the remaining radio frames get assigned one synchronized subframe per radio frame, as in 208. Alternatively, the eight remaining subframes may get assigned two synchronized subframes per radio frame, as in 210.

Figure 3:
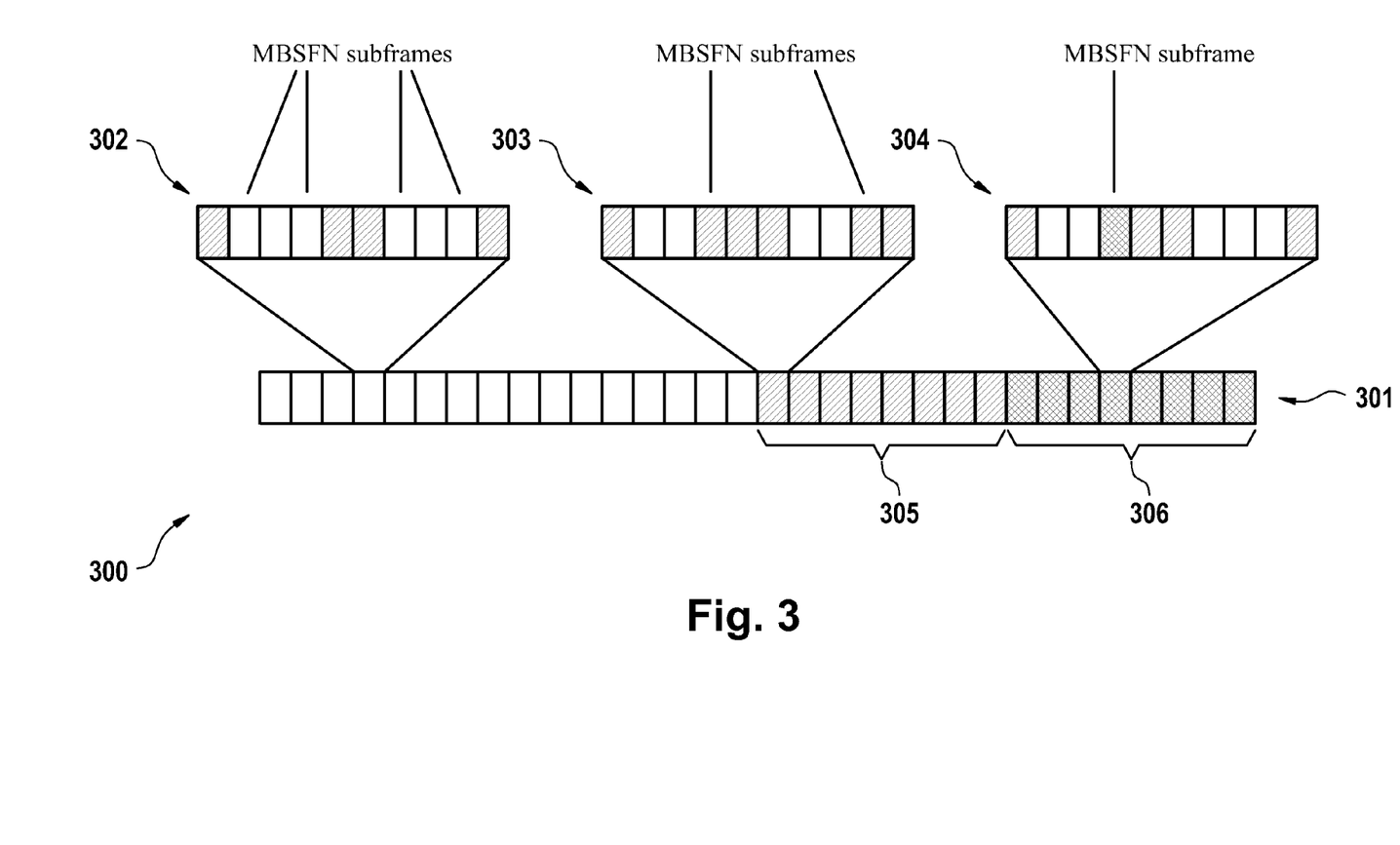
FIG. 3 shows an example of a resource allocation in a period of radio frames.

FIG. 3 shows an example 300 of the allocation of 32 radio frames in 301 and three different types of allocated subframes 302-304, that includes synchronized and not synchronized subframes.

The synchronized subframes may be also known as MBMS single frequency network (MBSFN) subframes. The frame 302 contains four synchronized or MBSFN subframes, the frame 303 contains two MBSFN subframes and the frame 304 includes one MBSFN subframe. The first 16 radio frames of the total of radio frames 301, contains four synchronized subframes per frame, wherein for all the radio frames, each frame contains ten subframes. The second half of radio frames is divided into frames that contain two synchronized subframes and frames with one synchronized subframe. In 305, the eight frames contain two synchronized subframes each and in the remaining eight radio frames 306, each frame contains one synchronized subframe. The total number, and the location of the MBSFN subframes is replicated by a plurality of base stations that are synchronized for providing multicast and broadcast services, and that transmit simultaneously this total number of radio frames 301 with this specific allocation of MBSFN subframes.

Figure 4:
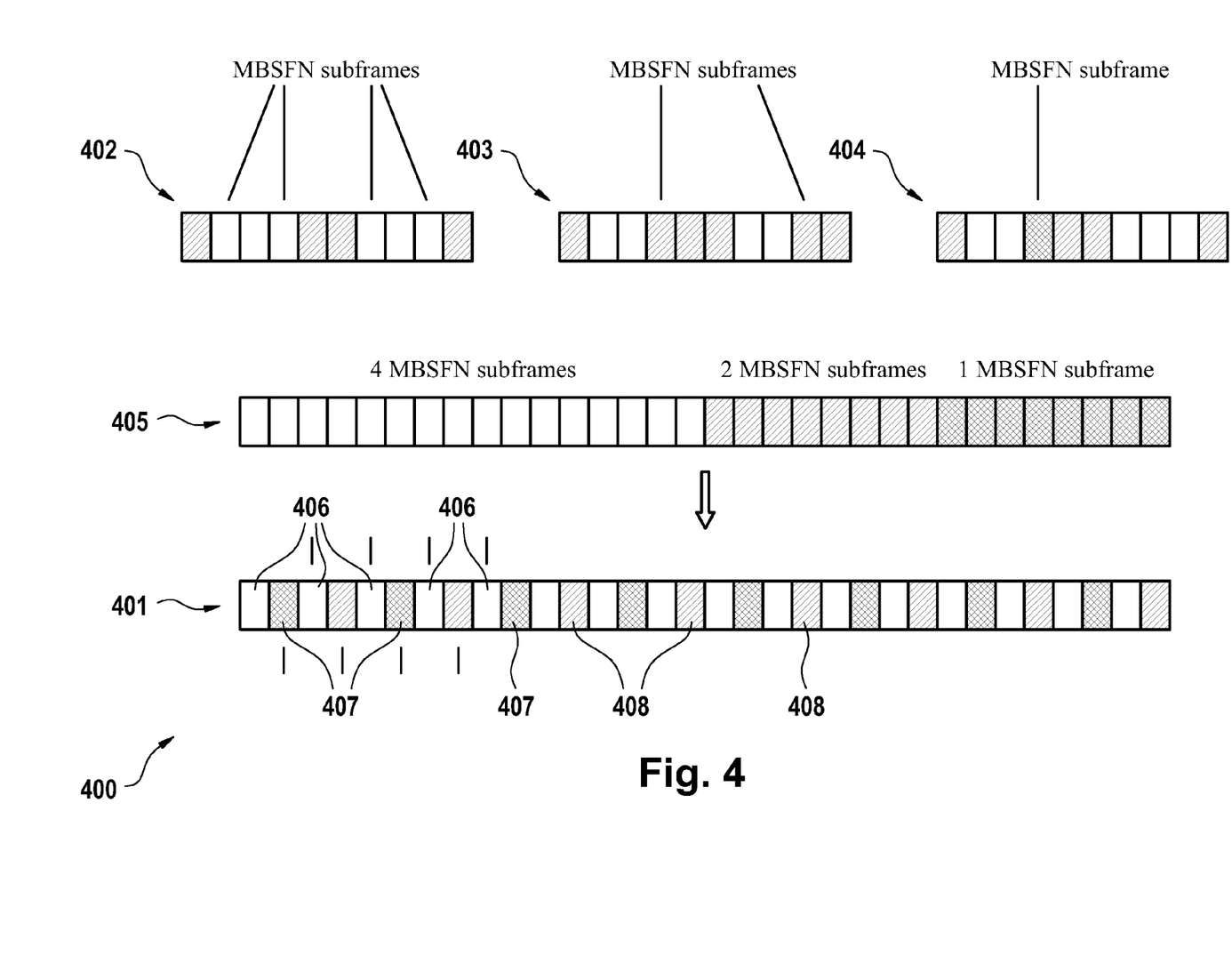
FIG. 4 shows a second example of a resource allocation in a second period of radio frames.

FIG. 4 shows another possible distribution 400 of the different types of frames within the total number of frames 401. This example contains also three types of frames 402-404, with four, two and one synchronized subframes respectively. After the allocation of the number of frames that contain each type of frame, that in this example corresponds to 16 frames with four MBSFN subframes, eight frames with two MBSFN subframes and eight frames with one MBSFN subframe, as in 405, any possible distribution is possible. The distribution of 401 shows that every second frame 406 contains four MBSFN subframes. The remaining frames are split by two MBSFN subframes per frame in 407 and one MBSFN subframe per radio frame in 408.

Figure 5:
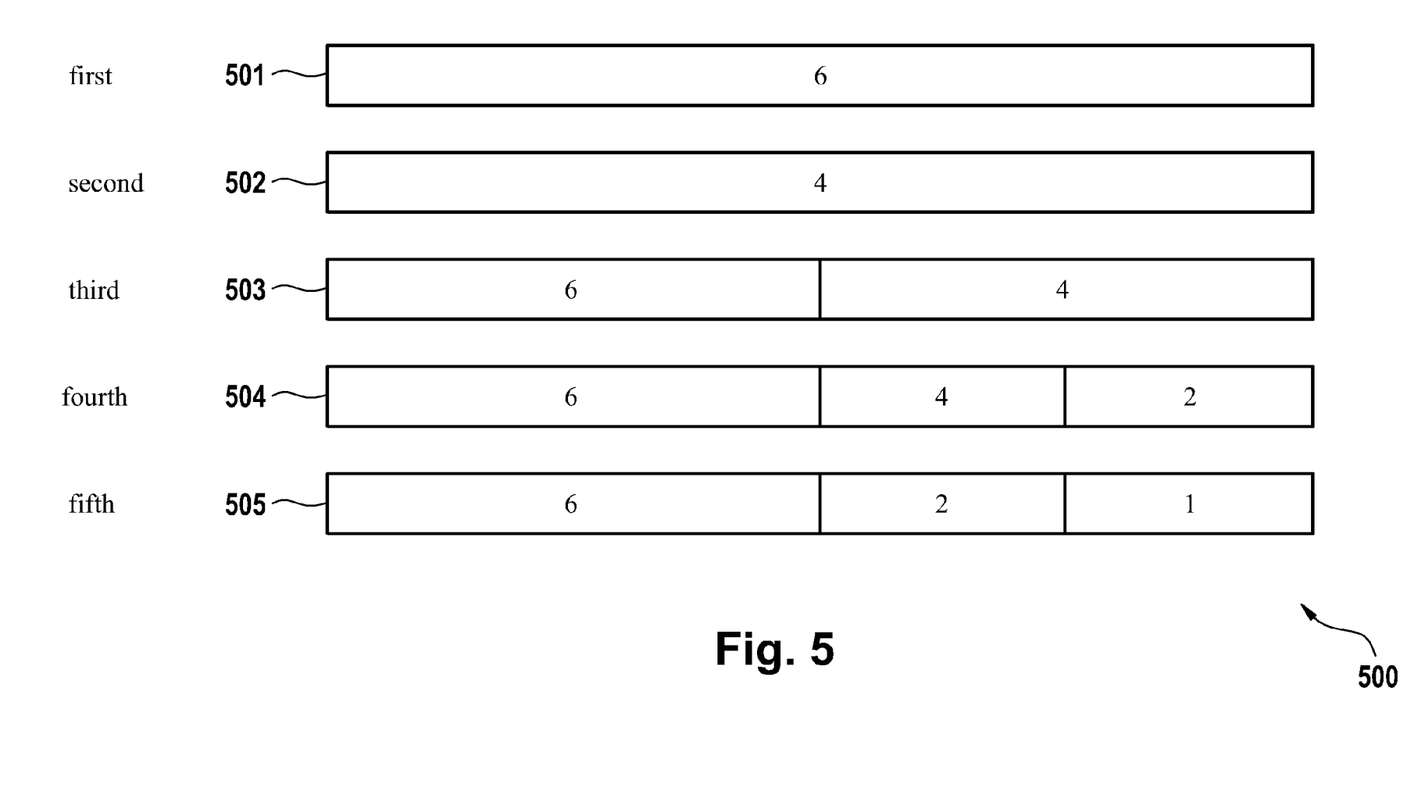
FIG. 5 shows a third example of the resource allocation method

FIG. 5 shows five different allocation possibilities 500, depending on the number of synchronized subframes allocated per radio frame. In a first type of allocation 501, all available radio frames get assigned six synchronized subframes per radio frame. This first type is selected if a maximum bandwidth requirement is needed for a first type of multimedia broadcast and multicast services. In a second type of allocation 502, all the radio frames get assigned four synchronized subframes, if a second type of multimedia broadcast and multicast services requires intermediate bandwidth. In a third type of allocation 503, half of the total number of radio frames gets assigned six synchronized subframes and the other half gets assigned four synchronized subframes. In this third type of allocation, the first type of services require the maximum bandwidth and get allocated six synchronized subframes. The second type of services require and intermediate bandwidth and get allocated four synchronized subframes.

In a fourth type of allocation 504, half of the total number of radio frames gets assigned six synchronized subframes. A quarter of the total number of radio frames gets assigned four synchronized subframes per radio frame. The remaining quarter of the total number of radio frames gets assigned two synchronized subframes per radio frame. This allocation refers to a first, second and third type of services with maximum, intermediate and low bandwidth requirements, respectively. Finally, in a fifth type of allocation 505, a first half of the total number of radio frames gets allocated six synchronized subframes. The second half is further divided by a third half that gets allocated two synchronized subframes per radio frame and the remaining forth half gets assigned one synchronized subframe per radio frame. This allocation refers to a first, second and forth type of services with maximum, intermediate and very low bandwidth requirements, respectively.

Figure 6:
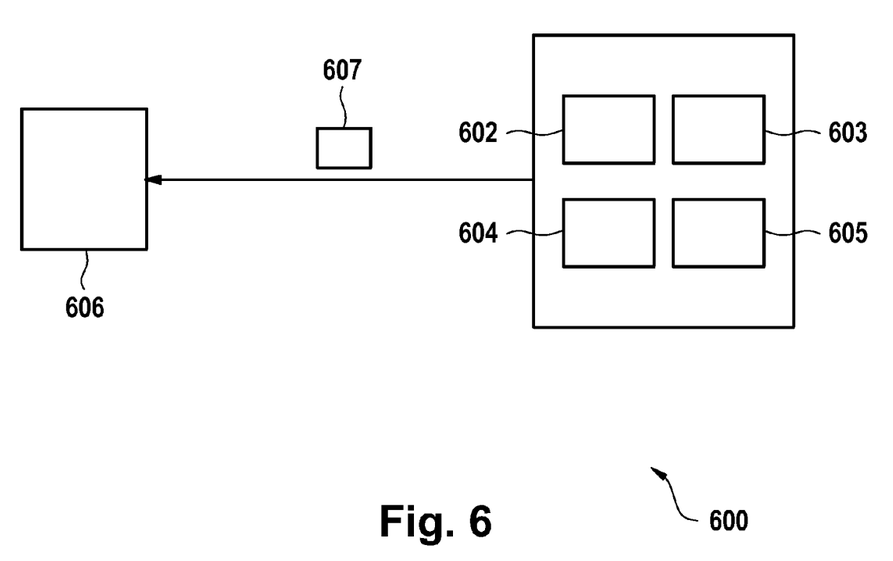
FIG. 6 shows an example of a network element.

FIG. 6 shows a network element for a mobile communication system 600, the network element 601 comprising means for inputting 602 a set of synchronized subframe numbers per radio frame and the total number of radio frames; means for 603 selecting a value of the set of synchronized subframe numbers and means for 604 allocating the selected value to a total number of radio frames or to half of the unassigned radio frames. If there are any remaining unallocated frames, the means for allocating 604 allocates a second value of the set of synchronized subframe numbers for allocating at least a portion of the unassigned radio frames. The network element 601 further comprises means for 605 transmitting a signaling 607 to a wireless terminal 606 indicating the allocating step, that is the configuration of the total number of radio frames and the synchronized subframes per radio frame. Alternatively, the wireless terminal 606 may comprise the means for inputting 602, means for selecting 603 and means for allocating 604.

| List of Reference Numerals | |
|---|---|
| 100 | Flowchart |
| 101 | First step |
| 102 | Second step |
| 103 | Third step |
| 104 | Forth step |
| 105 | Fifth step |
| 106 | Sixth step |
| 107 | Seventh step |
| 108 | Eight step |
| 109 | Ninth step |
| 110 | Tenth step |
| 200 | Tree diagram |
| 201 | All radio frames |
| 202 | Half of the radio frames |
| 203 | All of the radio frames |
| 204 | Half of the radio frames |
| 205 | All of the radio frames |
| 206 | Half of the radio frames |
| 207 | Half of the radio frames |
| 208 | The remaining radio frames |
| 209 | Half of the remaining radio frames |
| 210 | The remaining radio frames |
| 300 | Frames allocation |
| 301 | Total of radio frames |
| 302 | First type of frame |
| 303 | Second type of frame |
| 304 | Third type of frame |
| 305 | First portion of allocation |
| 306 | Second portion of allocation |
| 400 | Frame allocation |

-continued

List of Reference Numerals

| | |
|---|---|
| 401 | Total of radio frames |
| 402 | First type of allocation |
| 403 | Second type of allocation |
| 404 | Third type of allocation |
| 405 | Total of allocated radio frames |
| 406 | First type of allocated subframes |
| 407 | Second type of allocated subframes |
| 408 | Third type of allocated subframes |
| 500 | Resource allocation possibilities |
| 501 | First type of allocation |
| 502 | Second type of allocation |
| 503 | Third type of allocation |
| 504 | Fourth type of allocation |
| 505 | Fifth type of allocation |
| 600 | Mobile communication system |
| 601 | Network element |
| 602 | Means for inputting |
| 603 | Means for selecting |
| 604 | Means for allocating |
| 605 | Means for transmitting |
| 606 | Wireless terminal |
| 607 | signaling |

The invention claimed is:

1. A resource allocation method for a network element adapted for multimedia broadcast and synchronized services in a mobile communication system, said mobile communication system comprising a plurality of base stations synchronized for data transmission, the method comprising:
inputting a set of synchronized subframe numbers per radio frame and a total number of radio frames, wherein each radio frame contains a predefined number of subframes;
selecting a first value of said set of synchronized subframe numbers;
performing a first allocation wherein said first value is allocated as a number of synchronized subframes per frame to said total number of radio frames;
performing a second allocation wherein said first value is allocated as said number of synchronized subframes per frame to a first half of said total number of radio frames, if said first allocation is not performed;
selecting a second value of said set of synchronized subframe numbers;
performing a third allocation wherein said second value is allocated as said number of synchronized subframes per frame to said first half of said total number of radio frames, if said first and second allocation is not performed;
performing a fourth allocation wherein said second value is allocated as said number of synchronized subframes per frame to a second half of said total number of radio frames, if said second allocation is performed;
selecting a third value of said set of synchronized subframe numbers;
performing a fifth allocation wherein said third value is allocated as said number of synchronized subframes per frame to a third half of said second half of radio frames, if said first and forth allocation is not performed,
wherein one of said allocations is performed according to bandwidth requirements of said multimedia broadcast and synchronized services.

2. The method of claim 1 further comprising:
performing a sixth allocation wherein said second value is allocated as said number of synchronized subframes per frame to said total number of radio frames, if none of previous allocations is performed;
selecting a forth value of said set of synchronized subframe numbers;
performing a first allocation wherein said fourth value is allocated as said number of synchronized subframes per frame to a forth half of said second half of radio frames, if said fifth allocation is performed.

3. The method of claim 1, wherein said method outputs a look up table with a set of allocation possibilities.

4. The method of claim 1, wherein said set of synchronized subframe numbers is obtained by iteratively halving a maximum number of synchronized subframes per frame.

5. The method of claim 4, wherein if said maximum number of synchronized subframes per frame is not a power of two number, a next highest power of two number is used for obtaining said set of synchronized subframe numbers.

6. The method of claim 1, wherein a first radio frame is allocated with said first value and a second radio frame contiguous to said first radio frame is allocated with said second value.

7. The method of claim 1, wherein said network element is a base station, wherein said total number of radio frames is transmitted by said plurality of synchronized base stations.

8. The method of claim 1, wherein said synchronized subframes are used for said multimedia broadcast and synchronized service.

9. The method of claim 1, wherein said synchronized subframes are MBSFN subframes.

10. A network element for a mobile communication system, wherein the network element is configured to:
input a set of synchronized subframe numbers per radio frame and a total number of radio frames, wherein each radio frame contains a predefined number of subframes;
select a first value of said set of synchronized subframe numbers;
perform a first allocation wherein said first value is allocated as a number of synchronized subframes per frame to said total number of radio frames;
perform a second allocation wherein said first value is allocated as said number of synchronized subframes per frame to a first half of said total number of radio frames, if said first allocation is not performed;
select a second value of said set of synchronized subframe numbers;
perform a third allocation wherein said second value is allocated as said number of synchronized subframes per frame to said first half of said total number of radio frames, if said first and second allocation is not performed;
perform a fourth allocation wherein said second value is allocated as said number of synchronized subframes per frame to a second half of said total number of radio frames, if said second allocation is performed;
select a third value of said set of synchronized subframe numbers;
perform a fifth allocation wherein said third value is allocated as said number of synchronized subframes per frame to a third half of said second half of radio frames, if said first and forth allocation is not performed,
wherein one of said allocations is performed according to bandwidth requirements of said multimedia broadcast and synchronized services.

11. The network element of claim 10, wherein said network element includes a base station.

12. The network element of claim 10, wherein said network element is a wireless terminal.

13. The network element of claim 11, wherein said base station performs at least one of said allocations, wherein said base station sends a signaling to a wireless terminal indicating one of said allocations.

14. A mobile communication system, comprising:
a plurality of base stations;
wherein the mobile communication system is configured to:
input a set of synchronized subframe numbers per radio frame and a total number of radio frames, wherein each radio frame contains a predefined number of subframes;
select a first value of said set of synchronized subframe numbers;
perform a first allocation wherein said first value is allocated as a number of synchronized subframes per frame to said total number of radio frames;
second allocating perform a second allocation wherein said first value is allocated as said number of synchronized subframes per frame to a first half of said total number of radio frames, if said first allocation is not performed;
select a second value of said set of synchronized subframe numbers;
perform a third allocation wherein said second value is allocated as said number of synchronized subframes per frame to said first half of said total number of radio frames, if said first and second allocation is not performed;
perform a fourth allocation wherein said second value is allocated as said number of synchronized subframes per frame to a second half of said total number of radio frames, if said second allocation is performed;
select a third value of said set of synchronized subframe numbers;
perform a fifth allocation wherein said third value is allocated as said number of synchronized subframes per frame to a third half of said second half of radio frames, if said first and forth allocation is not performed,
wherein one of said allocations is performed according to bandwidth requirements of said multimedia broadcast and synchronized services.

15. The method of claim 1 implemented as a computer program product stored on a non-transitory storage medium, the computer program product comprising a computer-executable program configured to cause a network element to perform the method when the program is executed on the network element.

* * * * *